United States Patent Office 3,701,760
Patented Oct. 31, 1972

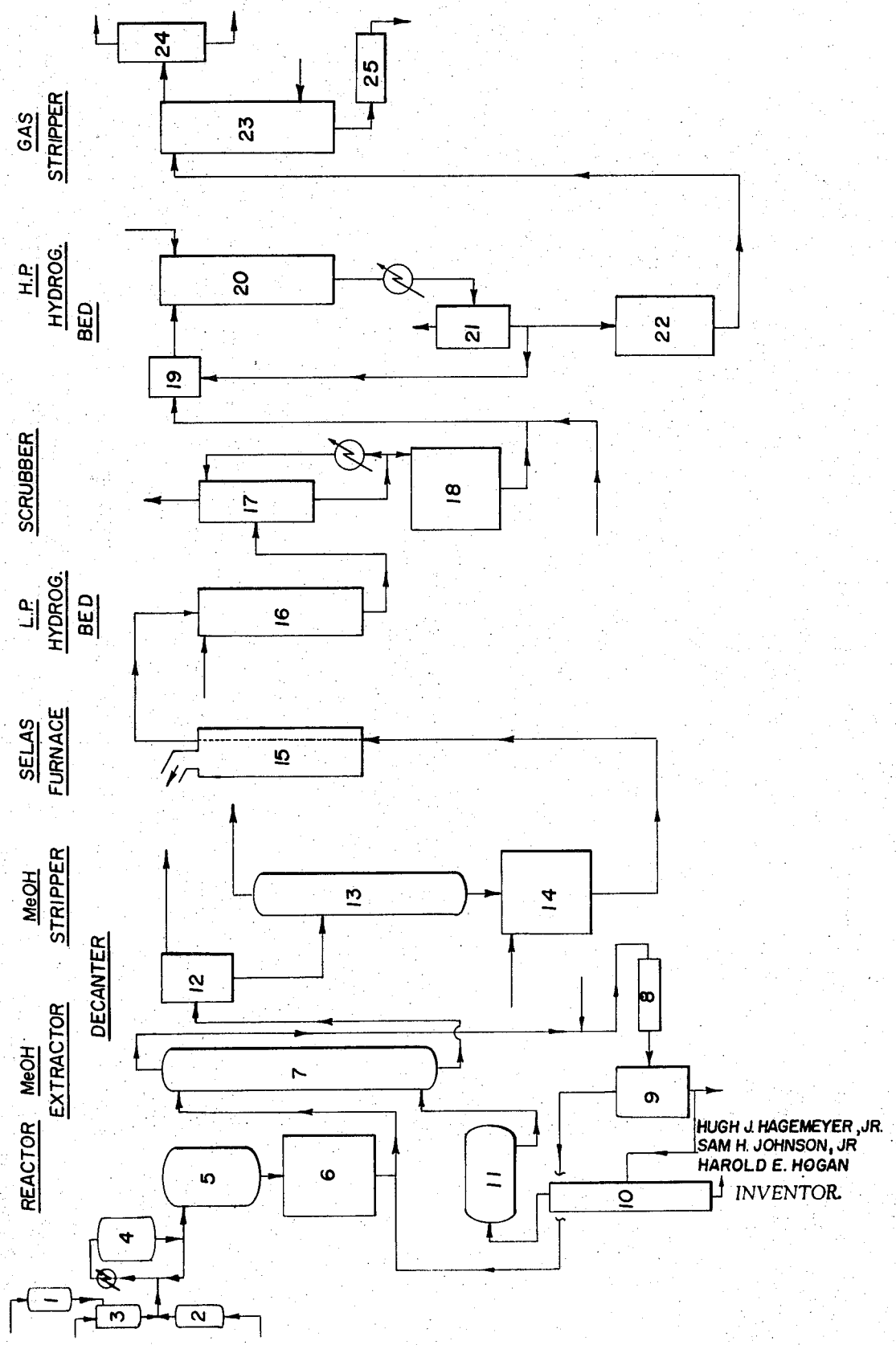

3,701,760
HYDROCARBON DAC-B RESIN PREPARED BY POLYMERIZING DAC-B USING TWO POLYMERIZATION TEMPERATURE RANGES FOLLOWED BY HYDROGENATION
Hugh J. Hagemeyer, Jr., Harold E. Hogan, and Sam H. Johnson, Jr., Longview, Tex., assignors to Eastman Kodak Company, Rochester, N.Y.
Filed Aug. 27, 1970, Ser. No. 67,333
Int. Cl. C08f *15/42*
U.S. Cl. 260—82                                              4 Claims

ABSTRACT OF THE DISCLOSURE

This invention provides a two-stage improved process for the preparation of light-color, high softening point hydrocarbon resins which comprises polymerizing a mixed hydrocarbon fraction using aluminum chloride as a catalyst in a two-stage reaction system. The temperature in the first stage is lower than that in the second stage to obtain a solution containing a high softening point crude resin in good yields. The chlorides are removed from the resin solution by methanol extraction or high temperature lime treatment followed by low pressure hydrogenation and/or alumina treatment followed by high pressure-high temperature hydrogenation to remove color and reduce unsaturation and thereafter stripping the resin solution to obtain a low color, color stable, melt stable, high softening point hydrocarbon resin in good yields.

---

This invention relates to novel compositions of matter, processes for their preparation and their uses.

In particular, this invention relates to a process for preparing low color, high softening point hydrocarbon resins in improved yields and more particularly to an improved process for preparing such resins. The invention further relates to a method of controlling the softening points of the crude hydrocarbon resin so that a high yield of low color final product can be obtained which are useful in various applications, such as tackifiers in hot melt adhesives.

It is known to prepare resins from mixed hydrocarbon fractions obtained in the thermal cracking of propane, ethane, and various petroleum fractions by polymerizing in the presence of an aprotonic Lewis acid polymerization catalyst and hydrogenating the resulting product over a hydrogenation catalyst. For example, U.S. Pat. 3,437,629 discloses a process for preparing resins by polymerizing and hydrogenating DAC-B and U.S. Pats. 3,442,877 and 3,484,421 disclose a process for preparing resins by polymerizing and hydrogenating steam cracked petroleum fractions. The softening point of the resins produced in these processes is controlled by stripping or vacuum distillation of the hydrogenation product but no method is disclosed for controlling the softening point of the crude (prior to hydrogenation) resin. Therefore, these processes are satisfactory for producing resins having a low softening point, i.e., ring and ball softening points of less than 120° C.; however, they suffer the disadvantage of not being able to produce a high softening point resin in sufficiently high yield to be commercially attractive. This is due to the fact that the low softening points obtained in the crude product yield an excessive amount of the polymerized-hydrogenated product which has to be removed by stripping or vacuum distillation resulting in low yields of high softening point resin. Furthermore, the temperatures required for stripping are so high that color is formed in the resin resulting in an unacceptable product. It would therefore be an advance in the art to provide a hydrocarbon resin having a high softening point, being thermally stable, and having a low color which can be used in applications such as hot melt adhesives.

In accordance with the present invention it has been discovered that a low color, color stable, high softening point hydrocarbon resin can be obtained by a process comprising polymerizing a mixed hydrocarbon fraction in the presence of $AlCl_3$ in a two-stage reaction system wherein the temperature in the first stage is lower than that in the second stage to obtain a solution containing a high softening point crude resin in good yields, removing the chlorides from the resin solution by methanol extraction or high temperature lime treatment followed by low pressure hydrogenation and/or alumina treatment followed by high pressure-high temperature hydrogenation to remove color and reduce unsaturation and thereafter stripping the resin solution to obtain a low color, color stable, high softening point hydrocarbon resin in good yields.

One such hydrocarbon resin is a resin prepared by polymerizing DAC-B (debutanized aromatic concentrate B). DAC-B is a complex mixture of saturated and olefinically unsaturated hydrocarbons obtained from the thermal cracking of a hydrocarbon stream to produce ethylene and/or propylene. The preparation and analysis of one such suitable DAC-B is described in U.S. Pat. 3,437,629.

The invention will be more clearly understood by reference to the flow chart of the attached figure for making the DAC-B resin of the present invention.

Referring to the flow chart, about 47 lb. per hour of DAC-B and about 0.6 lb. per hour of aluminum chloride at a 70 weight percent slurry in toluene are introduced into reactor 4 where polymerization is conducted at a temperature of about 50° to 100° C., preferably about 60°–80° C. and most preferably 70° C. The toluene and DAC-B prior to introduction into reactor 4 are dried by passing through molecular sieve beds 1 and 2, respectively. The residence time in reactor 4 is about 6–10 hours, preferably about 8 hours, and the resin solution contains about 45 to 60 weight percent, generally about 52 weight percent, resin having a softening point of about 110°–125° C., generally about 121° C. The resin solution from reactor 4 is introduced into reactor 5 where polymerization is continued for approximately 6–10 hours, preferably 8 hours, at a temperature of about 125°–150° C., preferably 135–145° C. The resin solution now contains about 70–80 weight percent, generally about 75 weight percent, resin having a softening point of about 125°–150° C., preferably about 140° C.

The resin solution from reactor 5 passes into mix tank 6 where mineral spirits is added at a rate of about 45 lb. per hour to obtain a solution containing at least 30 weight percent, preferably 35 weight percent, resin. About 26 lb. per hour of methanol are also added to the resin solution at this point to prevent precipitation of solids. The resin solution containing about 3300 p.p.m. total chlorides from mix tank 6 is then passed into the upper part of extractor 7 at a rate of about 17 gallons per hour (g.p.h.) and flows countercurrent to the methanol which is pumped at a rate of about 3.75 g.p.h. from storage tank 11 into the bottom of extractor 7. The extractor is operated at a temperature of about 40° C. to about 65° C., preferably about 60° C. In this extractor the catalyst is deactivated and the majority of the catalyst residues (chlorides) pass out the top in the methanol stream which flows into mixer 8 at a rate of about 52 lb. per hour. About 64 lb. per hour of water is mixed with the methanol stream in mixer 8 and this mixture passes into decanter 9. The organic layer from decanter 9 is returned to the upper part of extractor 7 and the lower water layer is fed into distillation column 10 where 40 lb. per hour of methanol containing about 30–40 p.p.m. chloride is recovered overhead and returned to storage tank 11. The base, which consists predominantly of water and chlorides, from distillation column 10 is discarded.

An alternate method to methanol extraction for removal of chlorides is high temperature lime treatment. In this method the resin solution from reactor 5 would be mixed with lime at a weight ratio of about 8:1 lime to $AlCl_3$ and subjected to a temperature of about 230–250° C. for a period of about 10 hours. The resin solution is then filtered to remove the lime and a resin solution containing <200 p.p.m. chlorides is obtained.

The resin solution from the base of extractor 7 flows into decanter 12 and from there into column 13 where dissolved methanol is distilled overhead. The methanol stream from column 13 and from decanter 12 are combined with the methanol stream from the top of extractor 7.

The resin solution from column 13 flows into mix tank 14 where about 90 lb. per hour of mineral spirits is added to obtain a resin solution containing less than 25 weight percent, and preferably less than 22 weight percent, resin, about 140 p.p.m. total chlorides, and about 10 percent unsaturation (C=C). The dilution step is necessary in order to achieve proper heat transfer characteristics in the following steps.

The resin solution from mix tank 14 passes through heater 15 and into the top of low pressure hydrogenation bed 16 at a rate of about 26 g.p.h. About 200 standard cubic feet/hour of hydrogen is fed into the top of the bed, preferably at a pressure of 100–1000 p.s.i.g., preferably 200–500 p.s.i.g., and flows in admixture with the resin solution through the bed.

The hydrogenation catalyst can either be a supported nickel such as Harshaw Ni-0104 or a palladium on alumina such as Engelhard 0.5 percent palladium on alumina. When a nickel catalyst is used the hydrogenation temperature is about 260–280° C. and when a palladium catalyst is used the hydrogenation temperature is about 290–310° C. Nickel is the preferred catalyst because of the lower operating temperature and was used in this specific example where hydrogenation temperature was 262° C.

Hydrogenation bed 16 is operated both as a dehydrohalogenation step and a hydrogenation step. One alternate method of accomplishing the same result is by use of high temperature alumina treatment. In this alternate method the resin solution from mix tank 18 would flow through an alumina bed at a temperature of greater than 240° C. rather than through hydrogenation bed 16. For more complete chloride removal from the resin solution at this point the hydrogenation and alumina treatment can be combined, and the resin solution is passed through the hydrogenation bed and subsequently subjected to alumina treatment.

Returning to the specific example, the resin solution-hydrogen mixture from hydrogenation bed 16 passes into heat exchanger-letdown vessel 17 where the pressure is reduced to 25 p.s.i.g. and the temperature to 45° C. Hydrogen and HCl are removed overhead and the resin solution passes into tank 18. The resin solution contains on the average less than 40 p.p.m. total chlorides, about 9 percent unsaturation (C=C) and a color of 500 on the APHA scale.

The resin solution from tank 18 passes through heater 19 and into the top of high pressure hydrogenation bed 20 at a rate of about 25 g.p.h. The bed is operated at a temperature of about at least 300° C., preferably 300–325° C., and uses a nickel catalyst. About 600 s.c.f.h. of hydrogen at a pressure of 3500 p.s.i.g. is fed into the top of the bed and the resin solution-hydrogen mixture passes through the bed into heat exchanger-letdown vessel 21 where the pressure is reduced to about 7 p.s.i.g. and the temperature to about 100° C. Hydrogen and HCl are removed overhead and the resin solution flows into tank 22. The resin solution has an average color value of 40 APHA, less than 2 p.p.m. total chlorides, 0.3 percent unsaturation (C=C) and contains about 20 weight percent resin having a softening point of about 120° C.

The high pressure hydrogenation is conducted at temperatures of greater than 300° C., preferably 315–325° C. and at hydrogen pressures of 3000–6000 p.s.i.g., preferably 3500–4500 p.s.i.g. These conditions are much more severe than normally used in the art; however, they are necessary in a commercial process because of the economic considerations (contact times) to obtain the low color and color stability required in the product. As a result of these severe conditions, degradation of the resin occurs in the hydrogenation step as evidenced by the decrease in softening point from about 140 to 120° C. Although this degradation would be detrimental in prior processes, it was found to be an unexpected advantage in the present proocess. For example, as the softening point of the crude resin is increased, the yield increases; however, the compatibility of the undegraded hydrogenated resin with polyolefins decreases and at crude resin softening points of about 120° C. and above hydrogenation of the resin without degradation produces a product that is not compatible with polyolefins. However, by degrading the resin in the hydrogenation step we have found that crude resin softening points of 145° C. and above will produce a compatible product. Therefore, by increasing the softening point of the crude resin and obtaining high yields we can hydrogenate at contact times that are economical and still obtain high yields of product even though degradation of the resin occurs at the hydrogenation conditions necessary for a low color, color stable product.

Returning to the specific example, the resin solution from tank 22 is fed into the top of gas stripper 23 at a rate of about 25 g.p.m. and flows countercurrent to hot methane gas which enters the bottom of the stripper at a rate of about 12,000 s.c.f.h. The gas stripper is operated at a temperature of about 240–260° C. The overhead from the stripper goes into distillation column 24 where mineral spirits solvent is removed overhead and recycled to solvent storage.

The molten resin product from the base of gas stripper 23 is fed to flaker 25 and packaged. About 30 lb. per hour of product resin is produced. This resin has a softening point of about 135° C., a Gardner color of less than 5, less than 3 p.p.m. chlorides and less than 1 percent unsaturation (C=C). The yield of product resin based on the DAC-B fed is found to be 60–70 percent.

An alternative method of stripping the resin solution is by vacuum distillation; however, because of the low pressures required, gas stripping is preferred.

All ring and ball softening points with the exception of the final products are determined on resins which have been stripped under 50 mm. Hg to a bottoms temperature of 320° C. The final product is stripped at conditions necessary to obtain the softening point desired.

The control of the crude resin softening point and yield in our process is accomplished by the use of a specific catalyst, the amount of catalyst used, and the two-stage polymerization procedure. The softening point and yield can be varied by the amount of catalyst used as shown in the following table:

| Run No. | Weight percent $AlCl_3$ | Softening point, °C. | Yield, percent |
|---|---|---|---|
| 1 | 0.3 | 113 | 70.2 |
| 2 | 0.375 | 134 | 74.6 |
| 3 | 0.4 | 138 | 83.9 |
| 4 | 0.425 | 144 | 77.8 |
| 5 | 0.8 | 146 | 81.6 |
| 6 | 1.3 | 162 | 87.3 |

Although the exact relationship between the amount of catalyst used, the softening point and yield will vary depending on the composition of the hydrocarbon mixture being polymerized, the softening point and yield will increase up to a point with an increase in the amount of catalyst used.

It is necessary that the polymerization be conducted in at least two stages, the temperature in the first stage being lower than that in the second stage. More than two stages can be used; however, there appears to be little advantage in more than two. The polymerization temperatures are subject to wide variation depending on the composition of the hydrocarbon fraction being poymerized, the catalyst concentration, the softening desired, etc.

The following examples illustrate the several variations of the novel hydrogenated DAC-B polymer products of the present invention.

EXAMPLE 1

DAC-B was polymerized with 1.3 weight percent aluminum chloride. In Run 1 a two-reactor system was used as shown in the flow chart. The first reactor was operated at 70° C. and the second reactor at 140° C. Residence time in each reactor was 8 hours. In Run 2 only the first reactor was used and runs were made at 70° C., 100° C. and 140° C. The resin solution from each of these runs was stripped at 50 mm. Hg to 320° C. bottoms temperature and the ring and ball softening point and percent yield determined. The results are as follows:

|  | Run 1 | Run 2 | | |
|---|---|---|---|---|
|  |  | 70° | 100° | 140° |
| Softening point, ° C | 141 | 121 | 120 | 121 |
| Percent yield | 75 | 52 | 65 | 70 |

EXAMPLE 2

DAC-B was polymerized with 1.3 weight percent aluminum chloride as described in the reference to the flow chart. In Run 2, 1.5 percent BF3 was substituted for aluminum chloride and the first reactor was operated at 10° C. and the second reactor was operated at 120° C. to obtain optimum results with this catalyst. In Run 3, 1.5 weight percent TiCl₄ was substituted for AlCl₃ and the first reactor was operated at 70° C. and the second reactor at 140° C. In Run 4 SNCl₄ was substituted for AlCl₃ and the first reactor operated at 70° C. and the second reactor at 140° C. The resin solution from each of these runs was stripped and 50 mm. Hg to 320° C. bottoms temperature and the ring and ball softening points and percent yield determined. The results are as follows with superior results using AlCl₃.

| Run | 1 | 2 | 3 | 4 |
|---|---|---|---|---|
| Softening point, ° C | 140 | 80 | 71 | 47 |
| Percent yield | 75 | 55 | 55 | 1 |

EXAMPLE 3

DAC-B was polymerized according to the process described in this invention. Four duplicate sets of runs (eight runs) were made in which the reaction conditions were varied to obtain different crude softening points. One run of each set was hydrogenated according to the present invention and the other run was hydrogenated at conditions such that no degradation occurred. All resins after hydrogenation were stripped to a resin having a softening point of 130° C. with the exception of Run 4 which was stripped to 140° C. The resins were tested for compatibility with polyethylene in the following manner:

Thirty percent of the resin and 70 percent of the polyethylene are placed in a resin flask and heated to 350° F. with gentle stirring. If a translucent melt with no phase separation is formed, the resin is rated compatible. If any haze or opaqueness is observed in the melt, the sample is rated incompatible. The resins were tested with several polyethylenes varying in viscosity from 750 cp. at 125° C. to 500,000 cp. at 190° C. and having densities of 0.90 to 0.93. The resins are useful in hot melt adhesive formulations.

The results are as follows:

|  |  | Compatible with polyethylene | |
|---|---|---|---|
| Run | Crude softening point, ° C. | Hydrogenated no degradation | Hydrogenated according to present invention |
| 1 | 110 | Yes | Yes. |
| 2 | 121 | No | Yes. |
| 3 | 132 | No | Yes. |
| 4 | 141 | No | Yes. |

The process of the present invention provides a light color, high softening point hydrocarbon resin. This resin has good thermal stability and finds utility, for example, as tackifiers for hot melt adhesives.

The invention has been described in detail with particular reference to preferred embodiments thereof, but it will be understood that variations and modifications can be effected within the spirit and scope of the invention.

We claim:

1. An improved process for preparing a light-color, high softening point hydrocarbon resin which comprises polymerizing DAC-B using aluminum chloride as a catalyst in a two-stage reaction system wherein the polymerization is conducted at a temperature of about 50° to 100° C. in the first stage for about 6–10 hours and subsequently polymerized in the second stage at a temperature of about 125° to 150° C. for about 6–10 hours to obtain a solution containing a high softening point crude resin in good yields, removing the chlorides from the resin solution by methanol extraction or high temperature lime treatment followed by low pressure hydrogenation at hydrogen pressure of 100–1000 p.s.i.g. and/or alumina treatment, followed by high pressure-high temperature hydrogenation at hydrogen pressures of 3,000–6,000 p.s.i.g. and temperature greater than 300° C. to remove color and reduce unsaturation and thereafter stripping the resin solution to obtain a low color, color stable, high softening point hydrocarbon resin in good yields.

2. The process according to claim 1 wherein the temperature in the first stage is 60–80° C. and the temperature in the second stage is 125°–150° C.

3. The process according to claim 1 wherein the temperature in the first stage is 70° C. and the temperature in the second stage is 135°–145° C.

4. A light color, high softening point hydrocarbon resin produced by the process according to claim 1.

References Cited

UNITED STATES PATENTS

| 3,437,629 | 8/1969 | Von Bramer et al. | 260—31.8 |
| 3,442,877 | 6/1969 | Moritz et al. | 260—82 |
| 3,484,421 | 12/1969 | Pine et al. | 260—82 |

JAMES A. SEIDLECK, Primary Examiner

S. M. LEVIN, Assistant Examiner